United States Patent Office 2,970,165
Patented Jan. 31, 1961

2,970,165
SULFATE COMPOUNDS

Raymond Michel, Paris, and Jean Roche, Bellevue, Meudon, France, assignors to Warner-Lambert Pharmaceutical Company, Morris Plains, N.J., a corporation of Delaware No Drawing. Filed Oct. 1, 1957, Ser. No. 687,367

2 Claims. (Cl. 260—457)

This invention relates to the 4'-sulfates of compounds of the following formula:

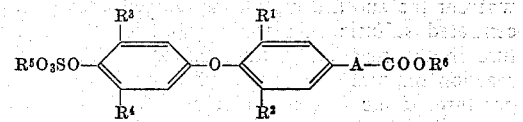

wherein:

$R^1$ is halogen.
$R^2$ is selected from the group consisting of hydrogen or halogen.
$R^3$ and $R^4$ are selected from the group consisting of hydrogen, halogen and lower alkyl.
$R^5$ is selected from the group consisting of hydrogen, alkali metals and alkaline earth metals.
$R^6$ is selected from the group consisting of hydrogen and lower alkyl, and
A is selected from the group consisting of a direct linkage, bivalent alkylene radicals, amino-substituted saturated alkylene, alkylamino-substituted saturated alkylene, acylamino-substituted saturated alkylene, unsaturated alkylene, amino-substituted unsaturated alkylene, alkylamino-substituted unsaturated alkylene, acylamino-substituted unsaturated alkylene, saturated oxoalkylene and unsaturated oxoalkylene radicals. Particularly these radicals may be shown as:

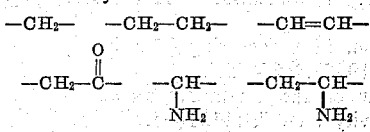

and

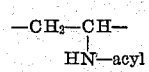

wherein acyl is acetyl, formyl, carbamyl, glycol and alanyl.

The foregoing compounds have the same thyroid-like activity and anti-thyroid activity of the parent, unsulfated compounds where there is a free hydroxy group in 4'-position. However, the sulfate group substantially increases the solubility of the parent compounds, and, on oral administration, the known physiological activity of said sulfated compounds is exhibited to a more rapid degree than that of the parent compounds.

The novel compounds of this invention are obtained by reacting the parent compound having a free hydroxy group in 4'-position with concentrated sulfuric acid in the cold. The temperature of reaction should be controlled, by suitable cooling means if necessary, so that the temperature does not rise above about 1° C. not only during the reaction itself but during the subsequent hydration of the sulfuric acid by dilution with water. Higher temperatures result in the formation of sulfonic acids rather than the desired sulfate. After hydration of the sulfuric acid, the alkali metal salt of the sulfate may be formed by adjusting the pH to about 8.5 with a base such as sodium hydroxide, for example. Where the sulfate being prepared is that of a compound having an amino-substituted side-chain, the latter compound may be more readily solubilized as the hydrochloride or sulfate acid addition salt.

As examples of the compounds prepared in accordance with this invention there may be mentioned the sulfates of the D- and L-isomers of thyroxine,
N-acetylthyroxine,
N-formylthyroxine,
N-carbamylthyroxine,
N-glycylthyroxine,
N-alanylthyroxine,
thyroxine methyl ester,
thyroxine n-butyl ester,
3'-fluoro-3,5-diiodothyronine,
3',5'-difluoro-3,5-diiodothyronine,
5'-fluoro-3,5,3'-triiodothyronine,
3,5-dichlorothyronine,
3,5-dichloro-3',5'-diiodothyronine,
3',5'-dichloro-3,5-diiodothyronine,
3,5,3'-L-triiodothyronine,
3,5,3',5'-tetrachlorothyronine,
3',5'-dibromo-3,5-diiodothyronine,
3,5,3',5'-tetrabromothyronine,
3,5-diiodothyronine,
3',5'-dimethyl-3,5-diiodothyronine,
3,5-diiodo-4-(4-hydroxy-3,5-diiodophenoxy)-phenyl-β-alanine,
3,5-diiodo-4-(4-hydroxy - 3,5 - diiodophenoxy)phenylglycine,
3,3'-diiodothyronine,
3,3',5'-triiodothyronine; also
3,5,3'-triiodothyroacetic acid,
3,5-diiodo-4-(4-hydroxy-3 - iodophenoxy)phenylpropionic acid,
3,5-diiodo-4-(4-hydroxy - 3 - iodophenoxy)phenylpyruvic acid,
3,5-diiodo-4-(4-hydroxy-3-iodophenoxy)cinnamic acid,
3,5-diiodo-4-(4-hydroxy-3,5 - diiodophenoxy)phenylacetic acid,
3,5-diiodo-4-(4-hydroxy-3,5 - diiodophenoxy)phenylpropionic acid,
3,5-diiodo-4-(4 - hydroxy - 3,5 - diiodophenoxy)cinnamic acid,
3,5-diiodo-4-(4-hydroxy-3,5-diiodophenoxy)phenylpyruvic acid,
3,5-diiodo-4-(4-hydroxy-3,5-diiodophenoxy)benzoic acid,
3,5-diiodo-4-(4-methoxy - 3,5 - diiodophenoxy)cinnamic acid,
3,5-dibromo-4-(4-hydroxy-3,5-dibromophenoxy)cinnamic acid,
3-iodo-4-(4-hydroxy-3-iodophenoxy)phenylacetic acid,
3-iodo-4-(3,5-diiodo-4-hydroxyphenoxy)phenylacetic acid,
3-iodo-4-(4-hydroxy-3-iodophenoxy)phenylpropionic acid,
3-iodo-4-(3,5-diiodo-4 - hydroxyphenoxy)phenylpropionic acid, as well as the alkali metal salts and alkaline earth metal salts of all the above-listed compounds which contain a free carboxyl group.

The sulfates formed may be separated, where they do not form insoluble barium salts, by neutralizing the excess sulfuric acid with barium carbonate, filtering off the barium sulfate which precipitates and then evaporating the filtrate to dryness. Alternatively, the neutralized aqueous solution of the sulfate, neutralized with sodium hydroxide, may be evaporated to dryness and the inorganic sulfate and sodium sulfate separated by fractional crystallization.

In order further to illustrate our invention but without being limited thereto, the following example is given:

EXAMPLE

*O-acid sulfate of L-3,5,3'-triiodothyronine*

32.5 mg. of L-3,5,3'-triiodothyronine is exhaustively dried under phosphorus pentoxide, cooled in solid $CO_2$ and added with rapid stirring, to 0.2 ml. of concentrated sulfuric acid, which was previously cooled to $-15°$ C. The temperature of the reaction mixture is held at $-15°$ C. for 15 minutes, then allowed to rise gradually over a period of 10 minutes, to $+1°$ C., and held at that temperature for 5 minutes. Thereafter the reaction mixture is diluted with ice rather than with water in order to prevent a sudden rise in temperature. Thus, the reaction mixture is cooled in solid $CO_2$ and slowly treated with 2.5 g. of finely powdered ice with vigorous mixing, after which the mixture is removed from the solid $CO_2$ bath, allowed to warm up to $-5°$ C. and treated dropwise, with stirring, with 1.4 ml. of .5 N aqueous sodium hydroxide. Care is taken to prevent the temperature from rising above $+1°$ C. The reaction mixture is then adjusted to pH 8.5 with 1 N aqueous sodium hydroxide and allowed to stand 1 hour at $+1°$ C. The resulting sodium sulfate precipitate is separated from the solution by centrifugation, extracted with 0.5 ml. of 0.1 N aqueous sodium hydroxide saturated with sodium sulfate and cooled to $+1°$ C. After centrifugation, the precipitate is discarded and the supernatant liquid combined with the supernatant liquid resulting from the previous centrifugation. The O-sulfuric ester of 3,5,3'-triiodothyronine remains in the resulting aqueous solution and can then be separated therefrom.

The O-acid sulfate of 3,5-diiodo-4-(4-hydroxy-3-iodophenoxy)phenylacetic acid is obtained in a similar manner.

What is claimed is:

1. A process for the production of compounds of the formula:

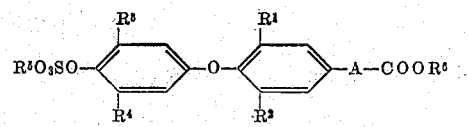

wherein $R^1$ is halogen, $R^2$ is selected from the group consisting of hydrogen and halogen, $R^3$ and $R^4$ are selected from the group consisting of hydrogen, halogen and methyl, $R^5$ is selected from the group consisting of hydrogen, alkali metals and alkaline earth metals, $R^6$ is selected from the group consisting of hydrogen and lower alkyl groups having 1 to 4 carbon atoms and A is selected from the group consisting of a direct linkage,

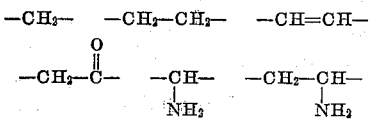

and

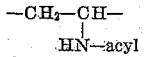

where acyl is selected from the group consisting of acetyl, formyl, carbamyl, glycyl and alanyl, which comprises reacting a compound of the formula:

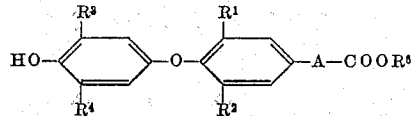

wherein the substituents are as defined above with concentrated sulfuric acid while maintaining the temperature in the reaction mixture below $1°$ C., diluting the reaction mixture with water while maintaining the temperature of the mixture at below $1°$ C. and recovering the product from the solution.

2. A process of producing the O-acid sulfate of L-3,5,3'-triiodothyronine which comprises reacting L-3,5,3'-triiodothyronine with concentrated sulfuric acid at a temperature of less than $1°$ C., diluting the reaction mixture with water while maintaining the temperature of the mixture at less than $1°$ C., adjusting the pH of the mixture to about 8.5 by the addition of aqueous sodium hydroxide solution at a temperature of less than $1°$ C., separating the precipitate of sodium sulfate which forms and recovering the O-acid sulfate of L-3,5,3'-triiodothyronine from the mother liquor.

References Cited in the file of this patent

UNITED STATES PATENTS 2,252,230    Loeser _____ Aug. 12, 1941

OTHER REFERENCES

Williams, Detoxication Mechanism, pages 70–73 (1947).

Wilkinson, Manufacturing Chemist, volume 26, pages 213–215 (1955), 167–65K.

Selenkow et al.: Chem Abstracts, volume 49, 1955, "Biol. Activity . . . ", 11131(b).